United States Patent
Dude et al.

(10) Patent No.: US 7,857,645 B2
(45) Date of Patent: Dec. 28, 2010

(54) CONNECTOR ARRANGEMENT FOR A MEDIUM-CONDUCTING, ELECTRICALLY-HEATABLE HOSE

(75) Inventors: Holger Dude, Vöhl-Obernburg (DE); Harald Koch, Frankenau-Alten Lotheim (DE); Karsten Albert, Bad Wildungen (DE); Christoph Dargel, Edertal-Bergheim (DE)

(73) Assignee: ContiTech Schlauch GmbH, Hannover (DE)

( * ) Notice: Subject to any disclaimer, the term of this patent is extended or adjusted under 35 U.S.C. 154(b) by 0 days.

(21) Appl. No.: 12/654,134

(22) Filed: Dec. 11, 2009

(65) Prior Publication Data
US 2010/0144182 A1    Jun. 10, 2010

Related U.S. Application Data

(63) Continuation of application No. PCT/EP2008/056462, filed on May 27, 2008.

(30) Foreign Application Priority Data
Jun. 12, 2007  (DE) ...................... 10 2007 027 620

(51) Int. Cl.
*H01R 4/60* (2006.01)
(52) U.S. Cl. .......................................... 439/191; 439/98
(58) Field of Classification Search ................... 439/98, 439/99, 190–194, 607.52
See application file for complete search history.

(56) References Cited

U.S. PATENT DOCUMENTS

| 4,881,909 A | 11/1989 | Blackman |
| 4,894,021 A | 1/1990 | Holden et al. |
| 5,357,948 A * | 10/1994 | Eilentropp ............. 128/204.17 |

FOREIGN PATENT DOCUMENTS

| DE | 19 45 008 | 3/1971 |
| DE | 102 01 920 | 8/2003 |
| EP | 1 610 049 | 12/2005 |

* cited by examiner

*Primary Examiner*—Tho D Ta
(74) *Attorney, Agent, or Firm*—Walter Ottesen

(57) ABSTRACT

A connector arrangement connects an electrically-heatable hose to a piece of equipment. The connector arrangement is configured as a plug connection wherein the hose has a first plug connector which can be plugged into a mating second plug connector mounted on the piece of equipment. The hose has at least one heater lead embedded in the hose and the heater lead has an end segment brought out of the hose for fitting with the first plug connector. The first plug connector includes a body having an annular housing region defining an end. A connector stub is arranged on the end for receiving an end portion of the hose thereon. An annular receptacle is pushed onto the annular housing region and has a surface and a helical slot formed in the surface. The end segment of the heater lead is helically placed in the helical slot so as to spirally cover over the annular housing region.

10 Claims, 2 Drawing Sheets

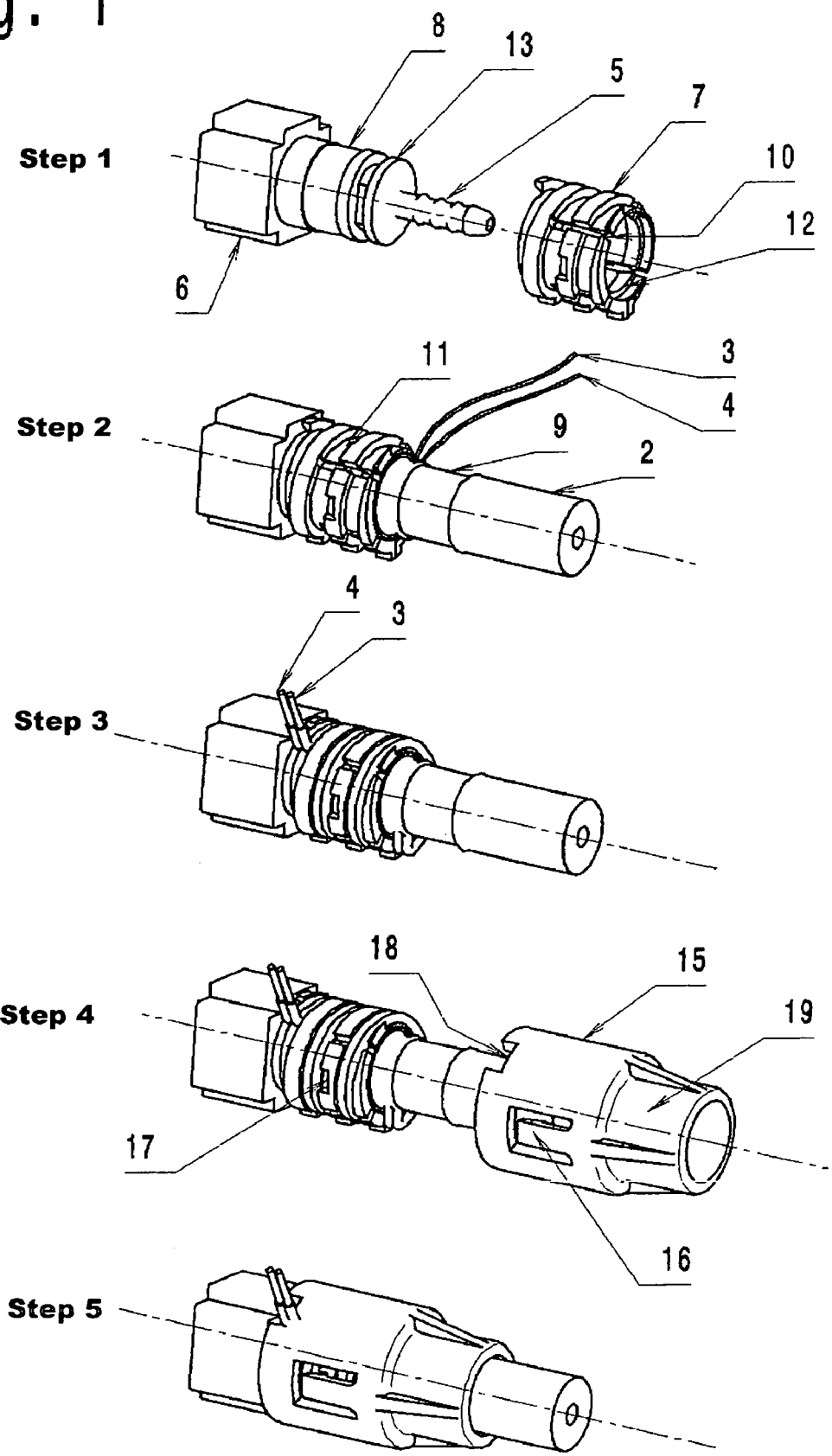

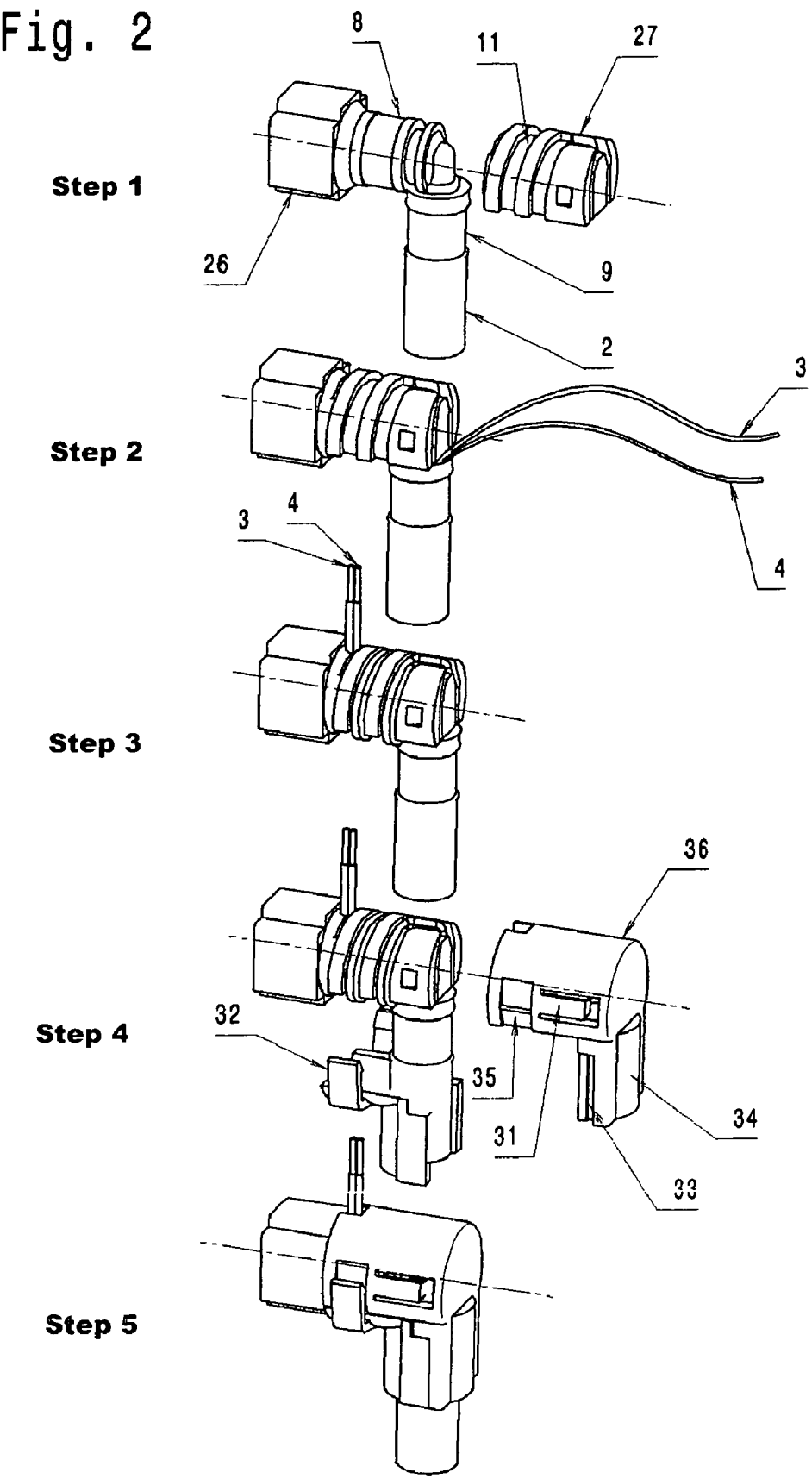

CONNECTOR ARRANGEMENT FOR A MEDIUM-CONDUCTING, ELECTRICALLY-HEATABLE HOSE

CROSS REFERENCE TO RELATED APPLICATIONS

This application is a continuation application of international patent application PCT/EP 2008/056462, filed May 27, 2008, designating the United States and claiming priority from German application 10 2007 027 620.8, filed Jun. 12, 2007, and the entire content of both applications is incorporated herein by reference.

FIELD OF THE INVENTION

The invention relates to a connecting arrangement for medium-conducting, electrically heatable hoses wherein the connecting arrangement includes a plug connector.

BACKGROUND OF THE INVENTION

Electrically-heatable hoses for use in motor vehicles are known in many forms. The medium which flows between two connecting points in these hoses is heated by these hoses.

A heatable hose with at least one electrical heating conductor, which is used to heat a medium flowing in the hose, is known, for example, from German patent publication 102 01 920 A1, where the heating conductor extends over at least part of the length of the hose and is comprised of a metallic core and a jacket.

The heating conductor is usually embedded in a layer of the hose. In a multi-layer hose, the heating conductor, can also be arranged between two layers. The ends of the heating conductor are exposed in order to be able to connect them to a voltage source which is necessary to operate the heating conductor. The exposed ends of the heating conductor are usually arranged at one end of the hose. However, it is also possible for an exposed end of the heating conductor to be arranged at each end of the hose.

The exposed ends of the heating conductor are provided with an electrical connection (plug) and are then connected to a voltage source. Since the voltage source is usually not arranged directly on the hose, the exposed ends of the heating conductor must be of a predefined length in order to be able to connect them to the voltage source via the plug.

European patent publication 1 329 660 B1 discloses a flexible multi-layer heatable hose having at least one reinforcement layer and an elastomer outer layer as well as an electrical heating conductor which is used to heat a medium flowing in the hose. The heating conductor extends over at least part of the length of the hose and is comprised of a metallic core and a jacket. The heating conductor is embedded outside the outer stratum of the reinforcement layer but under or inside the elastomer outer layer. In order to permit a simple and reliable electrical contact to be made between the heating conductor and a voltage source, the elastomer outer layer has a lesser strength than the heating conductor. This strength is dimensioned in such a way that the heating conductor can be exposed by means of a radially outwardly acting force by cutting through the original or weakened elastomer outer layer, but without damaging its metallic core and its jacket, and can be connected directly to an electrical connection. The heating conductor preferably extends in a helical shape at least over part of the length of the hose under or inside the elastomer outer layer.

Because the heating conductor is arranged outside the outer stratum of the reinforcement layer but under or inside the elastomer outer layer it is possible to expose the heating conductor without intervening in the reinforcement layer. This process can be carried out in the simplest case with pincers, with which the ends of the heating conductor, which are freely accessible at the front end of a hose section, are grasped and pulled radially outward. By preserving the jacket, the electrical insulation is maintained so that the metallic core cannot be adversely affected by corrosion or short-circuiting owing to penetrating moisture. The function of the elastomer outer layer is also maintained because the elastomer outer layer is cut only in the direct area in which the heating conductor is pulled radially outward. In the remaining area, the elastomer outer layer remains entirely unaffected. The heating conductor can therefore be led directly, that is, without additional insulation, to an electrical connection and connected electrically there.

It is disadvantageous that the exposed ends of the heating conductor, which are of a predefined length, are virtually completely unprotected from the point where they emerge from the hose up to their connecting point.

In order to ensure that the exposed ends of the heating conductor are protected over a predefined length from the point where they emerge from the hose up to their connection to an electrical component (for example, a voltage source), European patent publication 1 610 049 A2 discloses plugging a tube segment onto the end of the hose. The surface of the tube segment is connected to a tubular stub, which is arranged at an angle with respect to the longitudinal axis of the tube segment and in which connector element the exposed ends of the heating conductor are guided, the lateral surface having a passage leading to the connector element here.

This embodiment ensures, in the mounted state of the hose connecting system, that the ends of the heating conductor which are exposed over a predefined length at the end of the hose are not exposed immediately after the point where they emerge from the hose as far as their connection to an electrical component but are instead guided in a protected fashion in the connector element which is connected to the tubular element. In the mounted state, the connector element is preferably embodied in the manner of a 45° or 90° angular element. As a result, the ends of the heating conductor can be led to an electrical component which is arranged above the hose.

The described technology of the heatable hoses has been proven in the transportation of fluid media between two connecting points or connector elements for motor vehicle assemblies such as, for example, a reservoir tank, injection unit, pump etc. However, in particular applications it has been found that the fluid medium can freeze in the hose connector elements of the connecting blocks, which are usually embodied as standardized plug-in connectors, in particular quick-action plug-in connectors, and arranged at the hose ends.

This risk of freezing occurs, in particular, in exhaust gas post-treatment systems for reducing nitrogen oxide emissions of an internal combustion engine. In this context, nitrogen oxide is converted into atmospheric nitrogen and water vapor using selective catalytic reduction (SCR) technology. The reducing agent used here is aqueous urea solution which is carried along in the motor vehicle in a separate reservoir container. The aqueous urea solution is fed out of the reservoir container by a feed module or a pump and fed to a metering module, from which the urea solution is injected in a metered fashion into the exhaust gas stream upstream of the catalytic converter. Excess reducing agent is fed back into the reservoir container by the feed module via a return line.

Hose lines for conveying the reducing agent are present between the reservoir container, the feed module and the metering module. These hose lines have to be connected to the specified assemblies in order to produce the fluid connection.

For the hose connections to the assemblies, it is possible to use the quick-action plug-in connectors standardized in the automobile industry, at those hose ends whose receptacle part is mounted on the assemblies ex-factory. The quick-action plug-in connectors (quick connectors) have the advantage of rapid mounting of the hose and are known in a variety of embodiments. They are most frequently embodied as a "male part" on the assemblies and as a "female part" on the hose ends, the latter having a connector element for the hose end, onto which the end of the hose to be connected is pushed in a media-tight fashion and fastened.

The hose lines between the reservoir container and the exhaust gas line have to be capable of being heated, since below −11° C. there is a risk of the aqueous urea solution freezing. It is known to avert the risk of freezing by using the known, electrically heatable hoses. Although these electrically heatable hoses have been proven, in extreme applications the plug-in connectors are the weak point of the exhaust gas treatment systems in terms of the risk of freezing. There is still a risk of freezing in the plug-in connectors themselves.

In order to provide a device which provides protection against freezing of the aqueous urea solution even in the connections of the hose lines to the assemblies to be connected, it would be possible to use, for the hose connections, connecting blocks which can be heated by cooling water and which are embodied in such a way that the cooling water whose temperature can be controlled is rinsed through them. As a result, not only the hoses but also the plug-in connectors could be thawed.

The use of special quick-action plug-in connectors (quick connectors) which have a separate electrical heating element (for example a heatable ceramic component) would also be conceivable. It is disadvantageous that this is a very expensive and complex solution which also requires an additional electrical connection (plug).

SUMMARY OF THE INVENTION

It is an object of the invention to provide a connector arrangement of the type described initially herein wherein the entire line branch, that is to say the hose and the connecting points of the hose and of the assemblies to be connected, is provided with a continuous direct heating facility, and which is distinguished by a cost-effective solution with a minimum of technical complexity.

The connector arrangement of the invention is for an electrically-heatable hose conducting a medium to or from a piece of equipment. The connector arrangement is configured as a plug connection wherein the hose has a first plug connector which can be plugged into a mating second plug connector mounted on the piece of equipment. The electrically-heatable hose has at least one heater lead embedded in the hose over a portion of the length thereof. The heater lead has an end segment brought out of the hose for fitting with the first plug connector. The first plug connector includes: a body having an annular housing region defining an end; a connector stub arranged on the end for receiving an end portion of the electrically-heatable hose thereon; an annular receptacle pushed onto the annular housing region; the annular receptacle having a surface and a helical slot formed in the surface; and, the end segment of the heater lead being helically placed in the helical slot so as to spirally cover over the annular housing region. The annular receptacle can be either a closed annular receptacle or an axially open annular receptacle.

The hose connections can furthermore be equipped with standard plug-in connectors, in particular standard quick-action plug connectors (quick connectors). There is no need for an additional electrical connection since the heating conductor or conductors which is/are present in the hose can also be used to heat the quick-action plug connector.

The cylindrical heating conductor receptacle is seated on a cylindrical housing area of the quick-action plug connector and accommodates the free ends of the heating conductor or conductors of the heatable hose in the helical groove which is formed in the outer surface.

In one advantageous embodiment of the invention, a protective sheath is pushed on coaxially over the cylindrical heating conductor receptacle and can be latched to the heating conductor receptacle. As a result of the protective sheath which is latched to the heating conductor receptacle, the assembly of the plug connector is protected against slipping. In addition, the helical heating conductors are covered by the protective sheath. They project out of a front-end cutout in the protective sheath only with their connecting ends.

In a further advantageous refinement of the invention, the protective sheath has a front-end cutout which is open toward the plug connector. The heating conductor or conductors projects/project with their connecting ends out of the protective sheath through this cutout and contact can be made with them.

In a further refinement of the invention, the protective sheath has a cylindrical extension part which points away from the plug connector and whose internal diameter is slightly larger than the external diameter of the connected heatable hose. This cylindrical extension part relieves, in terms of forces, the connector element which holds the hose end. Lateral forces are applied directly to the plug connector housing.

In a further advantageous refinement of the invention, the cylindrical heating conductor receptacle has axial slits or slots which do not extend through, and at its end lying opposite the plug connector the cylindrical heating conductor receptacle has, in the internal circumference, a collar or rib which forms an undercut. As a result, the cylindrical heating conductor receptacle is embodied so as to be spring-biased at the circumference, and after the pushing-on process, it can latch in with the collar on the cylindrical housing area.

In a further advantageous refinement of the invention, the cylindrical heating conductor receptacle is embodied so as to be open axially approximately in the form of a semi-cylinder and is embodied as a part in the form of a half-shell whose cross section extends over a circular arc of 190° to 200°. This design of a heating conductor receptacle also permits a standard 90° plug connector to be heated.

In a further advantageous refinement of the invention, the protective sheath has a circular-arc-shaped circumferential cross section of 190° to 200°. Such a protective sheath also permits the heating conductor receptacles of a 90° plug connector to be protected.

An extension part is arranged in an advantageous way at a right angle at the end of the protective sheath which is open in the form of a halfshell. The extension part is also open in the form of a halfshell. This part in the form of a shell absorbs lateral forces starting from the hose and applies them directly into the plug connector housing.

The entire line branch, for example of the urea solution from the reservoir container as far as the exhaust gas line, is also provided with a continuous direct heating facility by virtue of the heatable connections. There is no longer a cold bridge inside the line branch.

BRIEF DESCRIPTION OF THE DRAWINGS

The invention will now be described with reference to the drawings wherein:

FIG. 1 shows part of a connector arrangement having a female quick-action plug connector with a connector stub for securely receiving the end portion of an electrically-heatable hose; and, FIG. 2 shows a modified quick-action plug connector whose connector stub for receiving the hose end is arranged at 90° with respect to the device axis.

DESCRIPTION OF THE PREFERRED EMBODIMENTS OF THE INVENTION

The plug connector is shown in five assembly steps in FIG. 1 and receives the end of an electrically-heatable hose 2. After the hose end has been fitted on an assembly (not shown), for example a reservoir tank, an injection unit, a pump et cetera, which has a male plug connector already mounted as a mating part, the connector arrangement, which is configured with a female quick-action plug connector 6 as a main component, is mounted by simple plugging in. The female plug structure cannot be seen in the perspective illustration and lies opposite the connector element 5.

The hose 2, which is shown with only a short segment, is heated with two coiled heating conductors or leads 3 and 4, often also referred to as heating stranded conductors, which are integrated into the hose structure. For the fitting of the electrical plugs (not shown here), the individual heating conductors 3 and 4 are exposed at the end of the hose 2. The two heating conductors 3 and 4 here are exposed at the end of the hose over a somewhat greater length than would be required if the fitting of the plug had followed directly. The hose element which is conductor free as a result is cut off.

A cylindrical heating conductor receptacle 7 is then pushed over the connector element 5 of the standard quick-action plug connector 6 and onto a cylindrical region 8 of the plug connector housing (step 1). The cylindrical heating conductor receptacle 7 is embodied so as to be spring biased at the circumference by virtue of axial, non-through slots 10, and after being pushed on, the receptacle 7 latches with a circumferentially-extending rib 12, which is configured at one end in the inner periphery, behind a collar 13 forming an undercut. The collar 13 is part of the quick-action plug connector 6.

The hose 2 is then pushed with its hose end onto a connector stub 5 of the plug connector 6. A wraparound ring 9 is pressed onto the hose 2 to secure it to the connector stub 5 (step 2).

The free ends of the two heating conductors 3 and 4 are coiled into a single helical groove 11 in the outer surface of the heating conductor receptacle 7 (step 3). The heating conductor receptacle 7 can also be configured as a multi-groove receptacle for the heating conductors.

In order to secure this assembly, a protective sheath 15, which is partitioned along an axial plane if appropriate, is pushed over the heating conductor receptacle 7 (step 4). This protective sheath 15 is constructed in such a way that it latches to the heating conductor receptacle 7 with two latching tongues 16 engaging cutouts 17 disposed along the circumference. The assembly therefore can no longer slip (step 5). The protective sheath 15 has a cutout 18 on the front end face thereof which is open toward the plug connector.

The conductors 3 and 4 heating the plug connector 6 are covered by the protective sheath 15. The heating conductors 3 and 4 are protected and insulated and project out of the protective sheath 15 only with their connecting ends.

If hoses having only a very small diameter are used, the connector stub 5, which is embodied as a hose connector element, has correspondingly very thin walls and is therefore very fragile. Under certain conditions (high transverse force), the connector stub 5 can break off at the junction with the plug connector housing.

In order to relieve the connector stub 5 of load, the protective sheath 15 is extended in length by a cylindrical part 19 which has a somewhat larger inner diameter than the outer diameter of the surrounded hose 2. At the other end, the cylindrical part of the protective sheath 15 rests on the outer periphery of the heating conductor receptacle 7. If the hose 2 is subjected to load, the protective sheath 15 absorbs the transverse forces and conducts them directly into the plug connector housing 6.

The modified connecting arrangement, which is shown in five assembly steps in FIG. 2, receives the end of an electrically-heatable hose 2. Parts identical to those in FIG. 1 are provided with the same reference numbers below.

The hose 2 is heated with two coiled heating conductors 3 and 4 which are integrated into the hose structure. In order to fit the electrical plugs (not shown here), the individual heating conductors 3 and 4 are exposed at the end of the hose 2. In this context, the two heating conductors 3 and 4 at the hose end are exposed over a somewhat greater length than would be required if fitting of the plug had followed directly. The hose piece, which is conductor free as a result, is cut off.

The hose 2 is pushed with its hose end onto a connector stub (not shown here) of a 90° standard quick-action plug connector 26.

Thereafter, a wraparound ring 9 is pressed onto the hose 2 in order to secure it onto the connector stub.

A heating conductor receptacle 27, which in terms of circumference does not comprise a complete cylindrical circumference but rather only 190° to 200°, is pushed from above onto the cylindrical region 8 of the housing of the 90° quick-action plug connector 26.

The free ends of the two heating conductors 3 and 4 are coiled into a single helical groove 11 in the outer surface of the heating conductor receptacle 27. The heating conductor receptacle 27 can also be configured as a multi-groove receptacle for the heating conductors 3 and 4.

In order to secure this assembly, a right-angled protective sheath 36 is pushed over the heating conductor receptacle 27 and latches at the periphery with two axial latching tongues 31 into the heating conductor receptacle 27. The protective sheath 36 is held tight in a position-oriented manner on the plug connector 26 by a locking element 32, which engages from below in a guide 33 on the downward-bent leg 34 of the protective sheath 36, and which latches into the protective sheath 36 in diametrically opposite peripheral cutouts 35.

If hoses with a very small diameter are used, the connector stub, which is embodied as a hose connector element, correspondingly has very thin walls and is therefore very fragile. Under certain conditions (high lateral force), the connector element can break off at the junction with the housing.

In order to relieve the connector stub in terms of forces, the protective sheath 36 is extended with a part 34 which is open in the form of a semi-cylindrical shell. The part 34 has a somewhat larger inner diameter than the outer diameter of the surrounded hose 2. Lateral forces can be absorbed by the positively-engaging connection of the protective sheath 36 to the locking element 32, and can be applied directly to the plug connector housing.

It is understood that the foregoing description is that of the preferred embodiments of the invention and that various changes and modifications may be made thereto without departing from the spirit and scope of the invention as defined in the appended claims.

LIST OF REFERENCE NUMERALS (Part of the Description)
- 2 Electrically-heatable hose
- 3 Heating conductor
- 4 Heating conductor
- 5 Connector stub
- 6 Plug connector
- 7 Heating conductor receptacle
- 8 Cylindrical housing area
- 9 Wraparound ring
- 10 Axial slots
- 11 Single helical groove
- 12 Peripherally-extending rib
- 13 Collar, undercut
- 15 Protective sheath
- 16 Latching tongues
- 17 Cutouts
- 18 End face, open cutout
- 19 Cylindrical part of the protective sheath
- 26 90° plug connector
- 27 Heating conductor receptacle
- 31 Axial latching tongues
- 32 Locking element
- 33 Guide
- 34 Bent-over leg; halfshell-like extension part
- 35 Peripheral cutouts
- 36 Protective sheath

What is claimed is:

1. In a connector arrangement for an electrically-heatable hose conducting a medium to or from a piece of equipment, the connector arrangement being configured as a plug connection wherein the hose has a first plug connector which can be plugged into a mating second plug connector mounted on said piece of equipment, the electrically-heatable hose having at least one heater lead embedded in said hose over a portion of the length thereof, the heater lead having an end segment brought out of said hose for fitting with said first plug connector, said first plug connector comprising:

a body having an annular housing region defining an end;
a connector stub arranged on said end for receiving an end portion of said electrically-heatable hose thereon;
an annular receptacle pushed onto said annular housing region;
said annular receptacle having a surface and a helical slot formed in said surface; and,
said end segment of said heater lead being helically placed in said helical slot so as to spirally cover over said annular housing region.

2. The first plug connector of claim 1, wherein said annular housing region is a cylindrical housing region and said annular receptacle is a cylindrical receptacle; and, wherein said plug connector further comprises: a protective sheath pushed on coaxially over said cylindrical receptacle; and, latching means for latching said protective sheath to said cylindrical receptacle.

3. The first plug connector of claim 2, wherein said protective sheath has an end face facing toward said body and said protective sheath has a cutout formed in said end face for passing said heating lead therethrough.

4. The first plug connector of claim 2, wherein said electrically-heatable hose has an outer diameter; said protective sheath has a cylindrical extension facing away from said body; and, said cylindrical extension accommodates said electrically-heatable hose therein and has an inner diameter slightly larger than said outer diameter.

5. The first plug connector of claim 1, wherein said annular housing region is a cylindrical housing region and said annular receptacle is a cylindrical receptacle; said cylindrical receptacle has a plurality of slots formed thereon which do not extend through the entire cylindrical wall of said cylindrical receptacle; said body has a collar formed thereon defining an undercut; and, said cylindrical receptacle has a rib formed on the inner periphery thereof for latching with said collar when said cylindrical receptacle is pushed onto said cylindrical housing region.

6. The first plug connector of claim 1, wherein said annular housing region is a cylindrical housing region and said annular receptacle is a cylindrical receptacle; said cylindrical receptacle is configured as an approximately half-cylindrical open part having a halfshell-like shape; and, when viewed in cross section, the wall of said cylindrical receptacle defines a circular arc in a range of 190° to 200°.

7. The first plug connector of claim 6, wherein said protective sheath has an open has halfshell-like shape and, when viewed in cross section, the wall of said protective sheath defines a circular arc in a range of 190° to 200°.

8. The first plug connector of claim 7, wherein said protective sheath has an end facing away from said body and a halfshell-like extension part extending at right angles at said end.

9. The first plug connector of claim 1, wherein said annular receptacle is a closed annular receptacle.

10. The first plug connector of claim 1, wherein said annular receptacle is an axially open annular receptacle.

* * * * *

UNITED STATES PATENT AND TRADEMARK OFFICE
CERTIFICATE OF CORRECTION

| | | |
|---|---|---|
| PATENT NO. | : 7,857,645 B2 | Page 1 of 1 |
| APPLICATION NO. | : 12/654134 | |
| DATED | : December 28, 2010 | |
| INVENTOR(S) | : Dude et al. | |

It is certified that error appears in the above-identified patent and that said Letters Patent is hereby corrected as shown below:

In column 1:
Line 34: delete "conductor," and substitute -- conductor -- therefor.
Line 34: delete "he" and substitute -- be -- therefor.

In column 8:
Line 41: delete "open has" and substitute -- open -- therefor.

Signed and Sealed this
Seventh Day of June, 2011

David J. Kappos
*Director of the United States Patent and Trademark Office*